J. R. C. AUGUST.
MUFFLE FURNACE.
APPLICATION FILED MAY 8, 1920. RENEWED JAN. 24, 1922.

1,414,614.

Patented May 2, 1922.

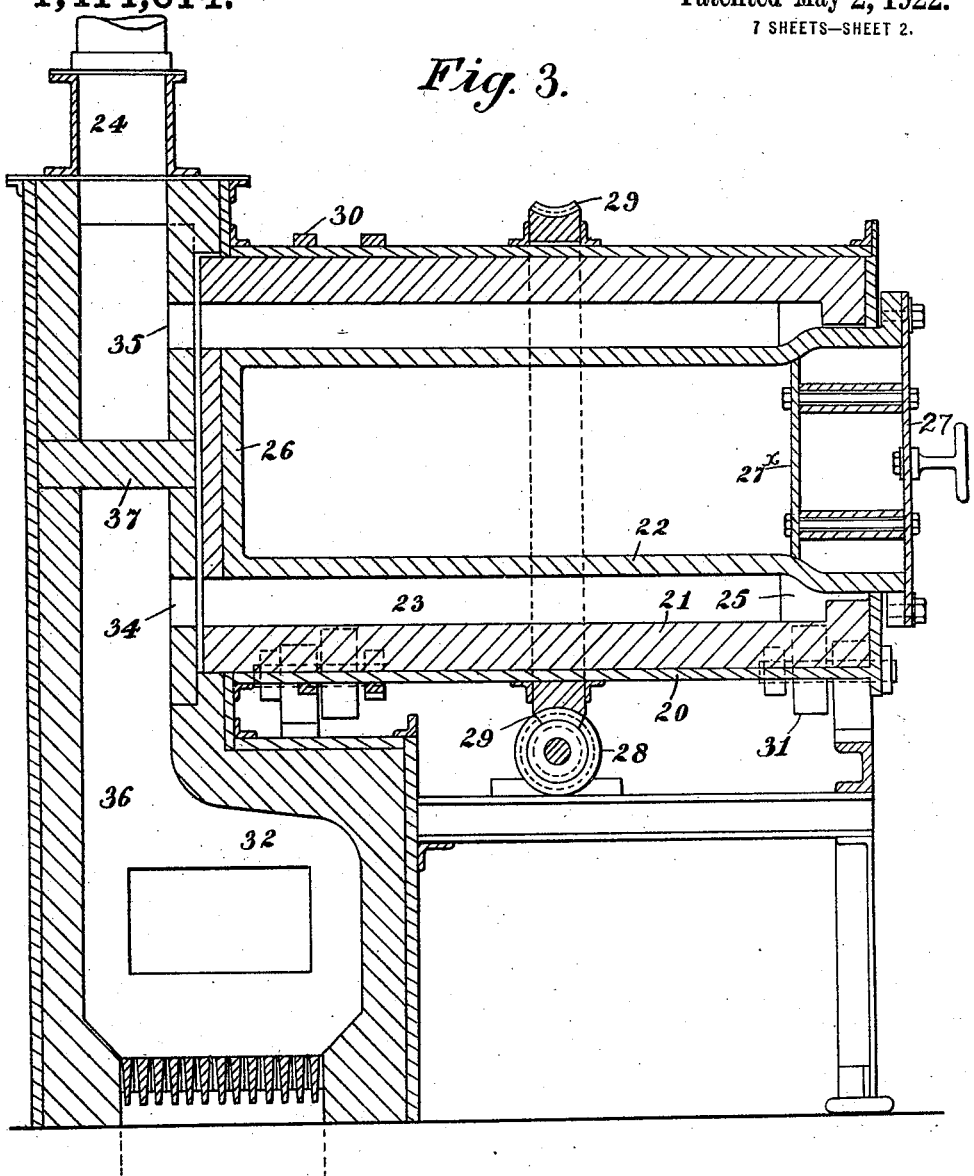

J. R. C. AUGUST.
MUFFLE FURNACE.
APPLICATION FILED MAY 8, 1920. RENEWED JAN. 24, 1922.

1,414,614.

Patented May 2, 1922.

UNITED STATES PATENT OFFICE.

JOHANNES ROBERT CARL AUGUST, OF HALIFAX, ENGLAND.

MUFFLE FURNACE.

1,414,614. Specification of Letters Patent. Patented May 2, 1922.

Application filed May 8, 1920, Serial No. 379,994. Renewed January 24, 1922. Serial No. 531,511.

*To all whom it may concern:*

Be it known that I, JOHANNES ROBERT CARL AUGUST, subject of the King of Great Britain, residing at Halifax, Yorkshire, England, have invented certain new and useful Improvements in or Relating to Muffle Furnaces, of which the following is a specification.

This invention has reference to rotary muffle or barrel furnaces of the type in which the muffle or barrel is concentrically mounted and supported by longitudinal bearers within a rotary heating chamber or furnace so that while both revolve together spaces are left between them. These spaces form flues for the heat to pass through and be uniformly distributed about the outside of the barrel.

My improved furnace is formed by the combination of a rotary heating chamber closed at one end and having a central aperture at the other, and a removable muffle or barrel inserted closed-end first, through the said aperture while the open end which is closed by a detachable cover is left projecting, the space between the rotary heating chamber and the barrel being sub-divided by longitudinal bearers into a plurality of longitudinal flues for the hot gases to pass through, the bearers forming throughout their length supports for the muffle which rotates with the heating chamber. The disposition of the parts is such that the barrel can be removed from the rotary furnace chamber when required, and replaced by a new one so that cracking or breaking of the barrel will not cause a collapse of the whole furnace structure because of the ease with which the barrel can be replaced.

The muffle furnaces with removable barrels were manufactured and placed upon the market by me in 1913. They comprise as shown in Figures 1 and 2 of the accompanying drawings (in which Figure 1 is a cross section and Figure 2 a sectional elevation on the line A, B of Figure 1) a cylindrical metal barrel 1 of unlined cast iron arranged to extend in a horizontal direction through a fixed nonrotatable furnace chamber 2 in the opposite end walls 3 of which it was mounted to rotate so that the barrel was surrounded by heat. This barrel was mounted on external carrying rollers 4, and rotated by a worm 5 meshing with a worm wheel 6 fixed to the barrel. The barrel 1 was closed at one end 7, while the other end was provided with a removable gas tight closure 8 to enable articles to be inserted into or removed from the barrel.

The temperature in the barrels 1 is very high and destructive to the cast iron or steel of which they are made, and as they cost anything from £18 to £30 each, and very seldom last more than ten days and sometimes very much less, the waste of material and expense involved is very unsatisfactory.

It will be noted that there is a very considerable span between the supports 3 in which the barrel 1 is mounted and as the barrel weighs about 15 cwts. or more, and the barrel at the high temperature at which it works (800° or 900° C.) becomes quite soft, so that sagging of the barrel is liable to occur, it will be understood that the conditions under which the barrel works are very severe, especially when it is loaded with 3 or 4 cwts. of material, the result being that the barrel will not for long withstand the rotary drive which in course of time twists and breaks it long before the metal is worn out.

The improvements which characterize the present invention will be understood from the following description reference being had to the accompanying drawings in which:—

Figure 3 is a longitudinal section of a solid fuel fired furnace embodying my improvements.

Figure 2:
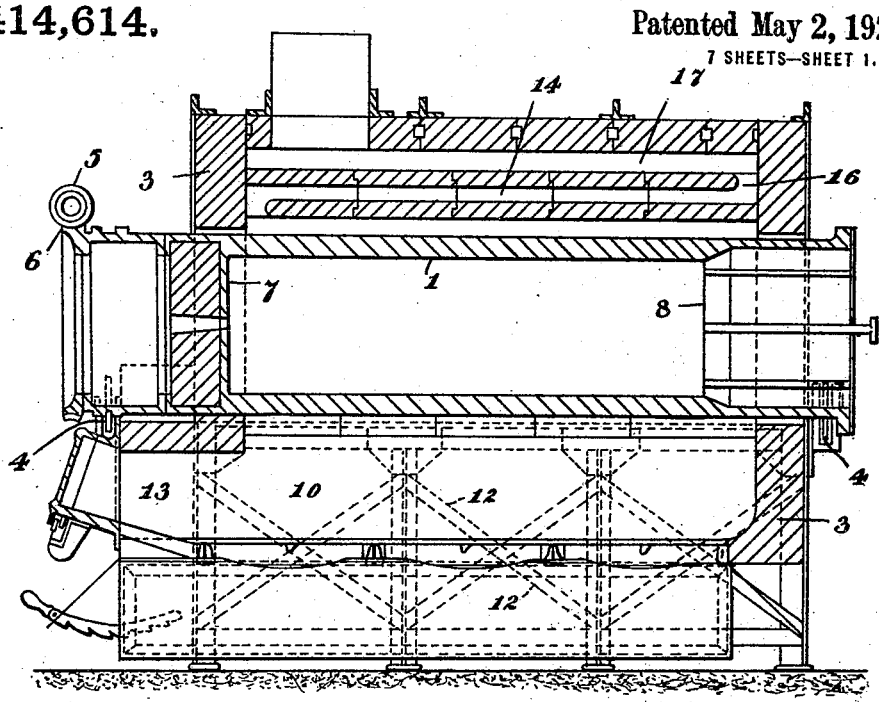
Figure 2 is a sectional elevation thereof on the line A—B of Figure 1.
Figure 1:
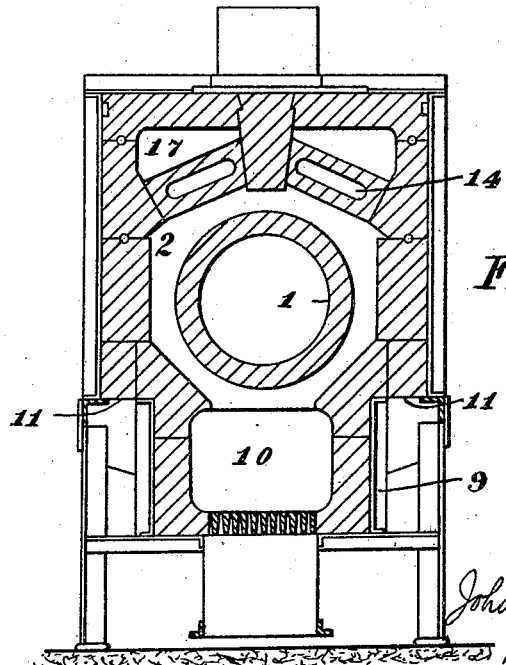
Figure 1 is a cross section of my muffle furnace.
Figure 4:
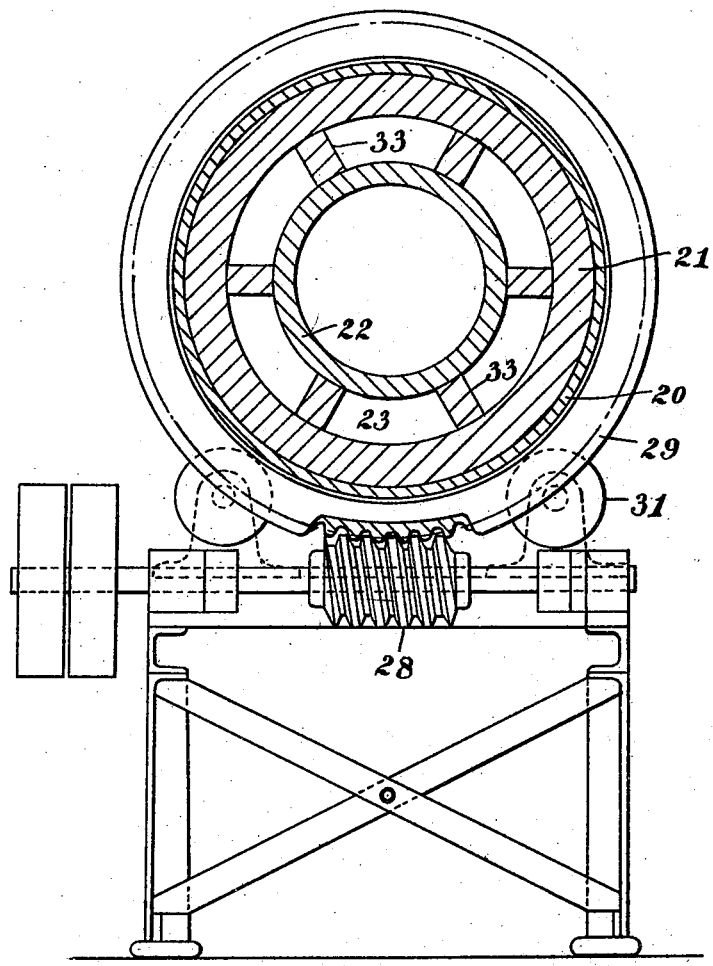
Figure 4 is a cross section thereof through the muffle.
Figure 5:
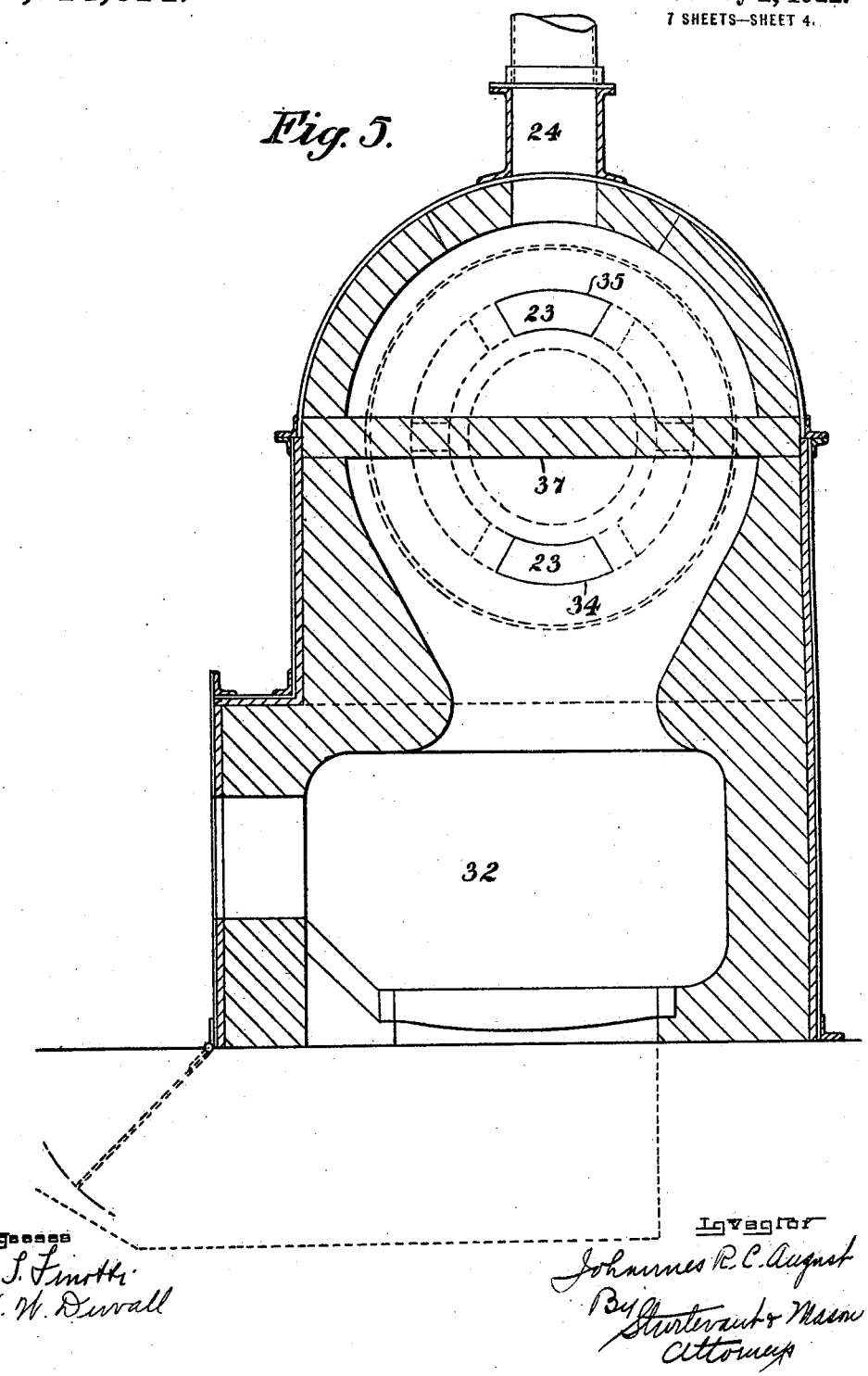
Figure 5 is a vertical section through the firebox.

Referring first to Figures 3, 4 and 5, the rotary heating chamber or furnace comprises a cylindrical metal casing 20 lined inside with fire clay slabs 21 and extends in a horizontal or slightly inclined direction, and the barrel or muffle 22 is supported inside this casing by longitudinal fire brick bearers 33, which serve to support the barrel concentrically inside the casing 20 and divide up the space between the barrel and the outer furnace chamber into a number of flues 23. At one end the rotary cylinder casing 20 has a circular concentric aperture 25, through which is passed the barrel 22. This barrel which may be made of fire-clay is closed at the inner end 26, while the outer end which may be enlarged a little as shown extends a little beyond the end of the cylindrical casing 20 and is provided with a removable gas tight cover or closure 27. This cover may consist of a plate 27 secured by nuts and set pins to the flanged outer end of the barrel 22, and may carry on its inner side by means of rods, an inner plate or diaphragm 27˟ which abuts against the shoulder at the junction between the barrel 1 proper and its enlarged end. By the removal of this cover, the articles to be subjected to heat treatment can be readily introduced and afterwards withdrawn. The cylindrical casing 20, 21 together with the bearers 33 and the barrel 22, is rotated by a worm 28 meshing with a worm wheel 29 on the external circumference of the said casing or rotary furnace 20. The disposition of the parts enables the barrel 22 to be withdrawn at any time when worn out or burnt through and replaced by a new one without disturbing the outer casing or the bearers 33. The outer circumference of the said casing is bonded with metallic bands 30 some of these forming the moving trackways for the carrying rollers 31. In the arrangement shown in these figures, the hot gases for heating the barrel 22 are generated by the burning of solid fuel in a fire box 32. At least two of the flues 23 are left open at the end where the heat is admitted as shown by the full lines in Figure 5 so that the gases from the burning fuel in the fire box 32 may enter into them, when an open end comes opposite a port 34 in the wall of the perpendicular flue 36, or escape therefrom to the chimney 24 when an open end comes opposite another port 35. The rotary heating chamber rotates against a fixed head in which are formed the said ports 34, 35 such ports being located at the same radius from the longitudinal axis of the rotary chamber as the said flues, so that when the apparatus is rotated the hot gases will at intervals enter the flues, and after they have made their circuit, escape from the flues when the open end of such flues come into coincidence with the port 35. If desired there may of course be more than one heat inlet port 34 and more than one outlet port 35. The means for enabling a backwards and forwards horizontal flow to the hot gases entering the port 34 along these flues 23 to take place, so as to provide adequate top and bottom heat to the barrel, consists in cutting the bearers away a little at alternate ends in such manner as to enable the hot gases after passing forwardly through one flue 23 to pass into and return through the next one, then forwardly through the succeeding flue and so on alternately until they finally escape through the other open ended flue when it comes opposite the port 35 that leads to the chimney 24. The fire box 32 is located in a suitable position relative to the rotary casing or furnace, and the products of combustion pass upwards through the perpendicular flue 36 which is closed about the centre line of the said rotary casing by a fire brick slab 37, while above this slab, the flue extends upwards to the chimney 24. These flues are located at the rear end of the rotary casing or furnace, that is at the opposite end to the removable gas tight cover or closure of the barrel, and the said rear end abuts and rotates against the wall of the said perpendicular flue. The wall of this flue below the slab has a port hole 34 already mentioned through which the combustion gases enter a longitudinal flue 23 outside the barrel 22, while the wall of the perpendicular flue above the slab 37 has another port hole 35 in it, by which the combustion products escape after following a circuitous course forwards and backwards longitudinally of the barrel 22, these port holes being so located that when the open end of one of these flues say 23 coincides with one of the port holes 34, the open end of the other open ended flue coincides with the other port hole 35. It will be understood therefore that a stream of hot gases will pass backwards and forwards of the barrel on the outside thereof, between it and the outer chamber and throughout its length, so that the heat is uniformly distributed about the barrel which is thus not heated more at one end than at the other end. If desired this form of furnace can be heated by liquid fuel instead of by the hot gases being generated by the burning of solid fuel.

Figure 6:
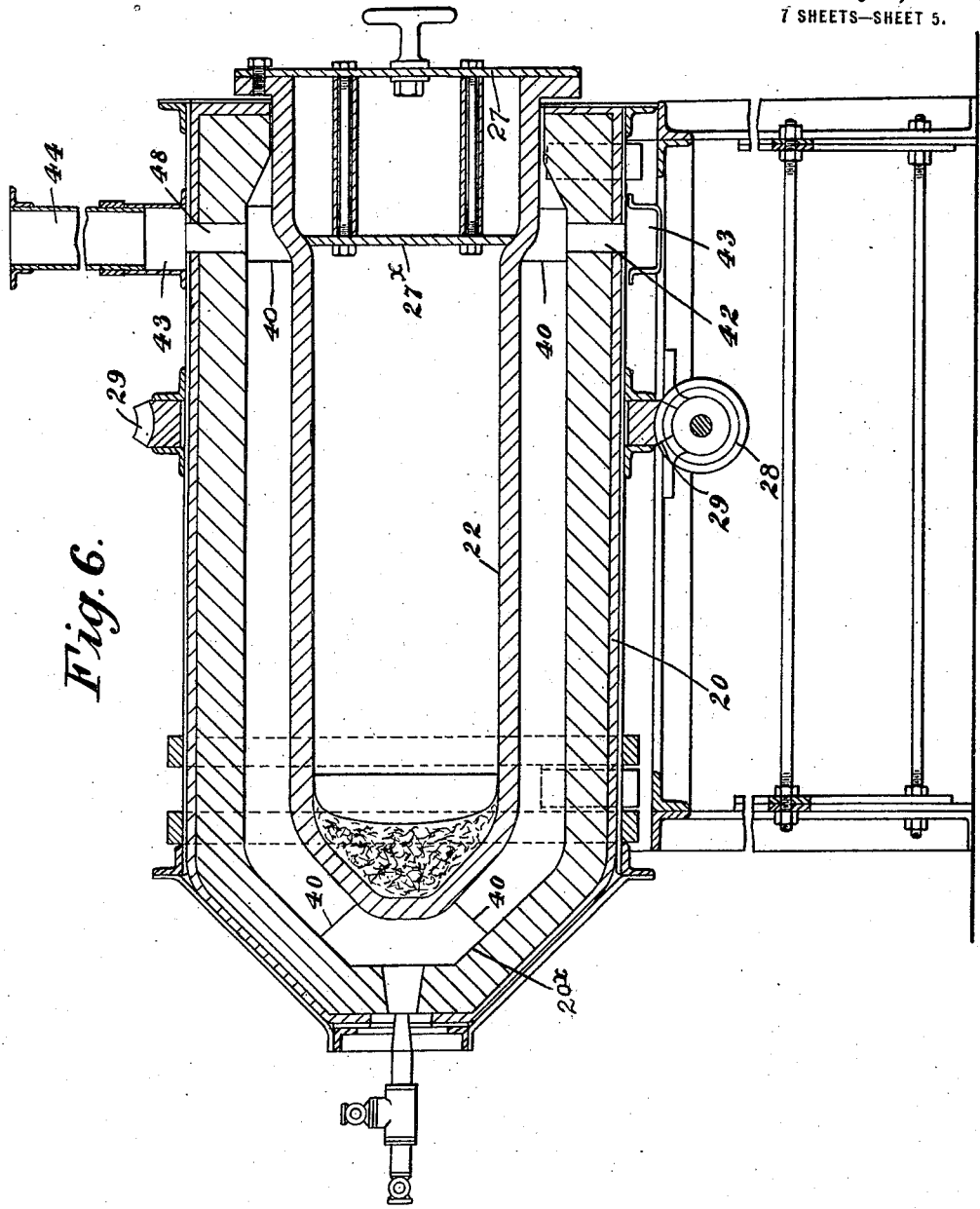
Figure 6 is a longitudinal section showing my improvements applied to a gaseous or liquid fuel fired furnace.
Figure 7:
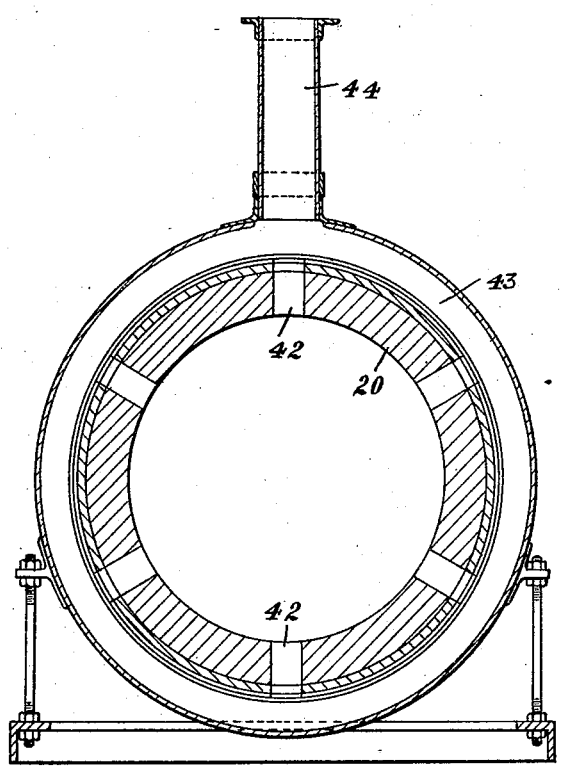
Figure 7 is a cross section thereof with the barrel removed.
Figure 8:
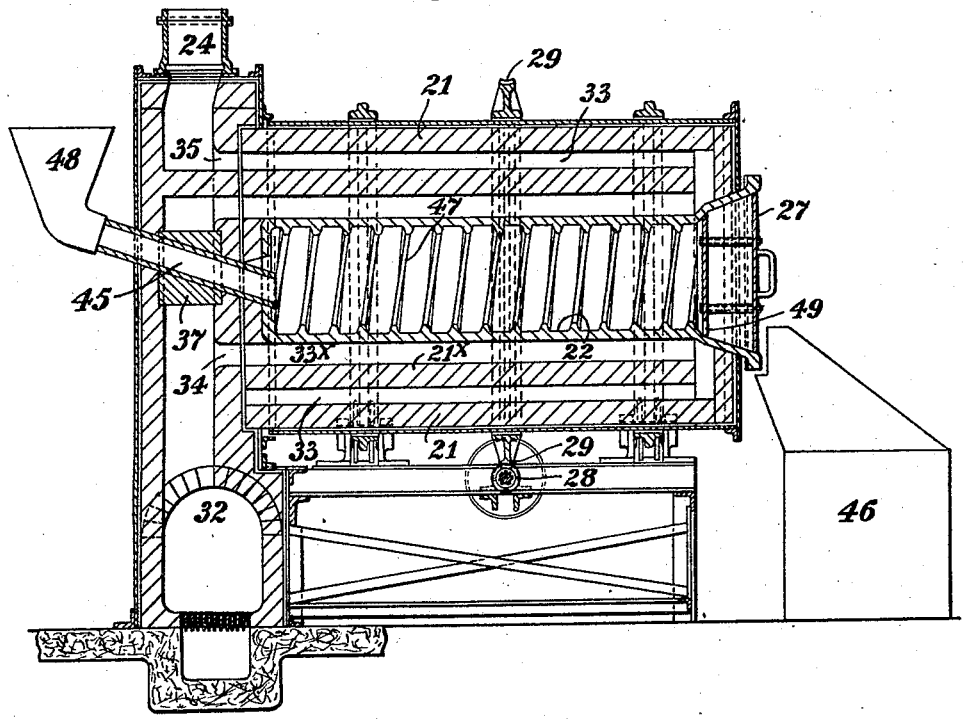
Figure 8 is a longitudinal section of a solid fuel fired furnace similar to that shown in Figure 3, but provided with means for automatically feeding the muffle at one end.

An arrangement of furnace heated by the burning of liquid or gaseous fuel or powdered fuel, comprises a rotary furnace chamber 20 extending somewhat beyond the barrel 22 at the end opposite to that where the removable gas tight cover or closure 27 is located, and the interior at the end 20˟ is made of conoidal shape while the corresponding end of the barrel 22 which is closed is made of similar shape reference being had to Figures 6 and 7. The barrel is supported inside the furnace chamber by longitudinal fire brick bearers 40 spaced apart to form flues, and the muffle is heated by gas and air admitted by a burner 41 at the conoidal end of the furnace chamber 20, which points towards the conoidal end of the barrel 20, the inside of the barrel at that end being packed with asbestos or other suitable material if desired. The hot combustion products impacting against the conoidal end of the barrel 20 pass along the flues formed by the bearers 40 from one end to the other and where they are discharged through radial openings 42 in the furnace chamber 20 into an annular stationary chamber 43 outside the rotating furnace chamber from whence they escape to the chimney 44. If desired, the rotary furnace 21 with its inside barrel 22 may be provided with a feeding chute 45 at the closed end, as shown in Figure 8, delivering into the muffle at the axis of rotation, and with means for delivering the articles removed through the cover 27 at the other end into a cooling medium contained in the receptacle 46, as, for example, oil or water, and a spiral device 47 may be provided inside the barrel 22 to produce a screw effect. In this case the rotary furnace 21 with its barrel 22, may extend in a slightly inclined direction and as the articles to be subjected to heat treatment are fed into the barrel at one end through the chute 45 from the hopper 48, they are caused to continually move towards the delivery end by the action of the spiral 47 and be finally delivered thereto through the aperture 49. In this particular figure the barrel or muffle 22 is supported inside an inner heating chamber 21× by fire brick bearers 33×, so as to divide up the space into a number of flues, and this inner chamber 21× is supported inside the main outer heating chamber by a number of similar fire brick bearers 33, the two sets of flues being interconnected as shown. Any heat escaping through the aperture 49 is more than compensated for by the supplementary set of flues between the barrel 22 and the inner furnace. The remaining reference numerals in this Figure 8 refer to like parts in Figures 3 and 4.

I declare that what I claim is:—

1. A rotary furnace of the rotary barrel type, formed by the combination of a rotary heating chamber closed at one end, and having a central aperture at the other, and a removable muffle or barrel inserted closed end first, through the said aperture while the open end which is closed by a detachable cover is left projecting, the space between the rotary heating chamber and the barrel being subdivided by longitudinal bearers into a plurality of longitudinal flues for the hot gases to pass through, the bearers forming throughout their length supports for the muffle which rotates with the heating chamber.

2. A rotary furnace of the rotary barrel type, comprising in combination a rotary heating chamber, a removable muffle inserted closed end first into the said chamber, longitudinal bearers by which the space between the chamber and the muffle is subdivided into flues, such bearers being cut away at alternate ends in such manner as to enable the hot gases after passing forwardly through one flue to pass into and return through the next one, then forwardly through the succeeding flue and so on alternately, so as to provide adequate top and bottom heat.

3. A rotary furnace of the rotary barrel type, comprising in combination a rotary heating chamber, a removable muffle mounted and supported inside the chamber by bearers and in which at least two of the longitudinal flues inside the rotary heating chamber are left open at the end where the heat is admitted, and the rotary heating chamber rotates against a fixed head provided with ports located at the same radius from the longitudinal axis of the rotary chamber as the said flues, at least one of these ports being an intake for the heating gases and another a discharge opening, through which the hot gases escape to the chimney, so that when the apparatus is rotated the hot gases will at intervals enter the flues, and after they have made their circuit, escape from the flues when the open end of such flues come into coincidence with the port.

4. A rotary chamber of the rotary barrel type, comprising in combination a rotary heating chamber, a removable muffle mounted and supported inside the chamber by bearers a perpendicular flue passes upwards from the fire box against one wall of which flue the rotary heating chamber with its internal muffle and bearers rotate, the said perpendicular flue being closed about the centre line of the said rotary heating chamber by a fire brick slab above which the flue extends to the chimney, an intake port or ports for the entrance of the hot gases into the flues being located below this slab, and a discharge port or ports above it.

5. A rotary furnace of the rotary barrel type, comprising in combination a rotary heating chamber, a removable muffle mounted and supported inside the chamber by bearers, the said chamber extending somewhat beyond the barrel at the end opposite to where the removable gas tight cover is located, and the interior of the said end is made of conoidal shape while the corresponding end of the barrel which is closed and spaced away from the heating chamber is made of similar shape, and in which the muffle is heated by fuel gas admitted by a central burner at the conoidal end of the rotary chamber, so as to direct the heat against the said conoidal end and cause it to pass along the longitudinal flues between the bearers all round the barrel.

6. A rotary furnace of the rotary barrel type, comprising in combination a rotary heating chamber, a removable muffle mounted and supported inside the chamber by bearers, a central burner for fuel gas, at one end of the rotary chamber, radial openings in the chamber at the other end thereof, and an annular fixed chamber outside the rotary chamber into which the hot combustion products are discharged through the radial openings.

In witness whereof, I have hereunto signed my name this 19th day of April, 1920, in the presence of two subscribing witnesses.

JOHANNES ROBERT CARL AUGUST.

Witnesses:
AUGUSTUS E. INGRAM,
ED. B. NICHOLS.